Apr. 10, 1923.
T. BROWN
MOTOR CULTIVATOR
Original Filed March 23, 1917
1,451,672
3 Sheets-Sheet 3
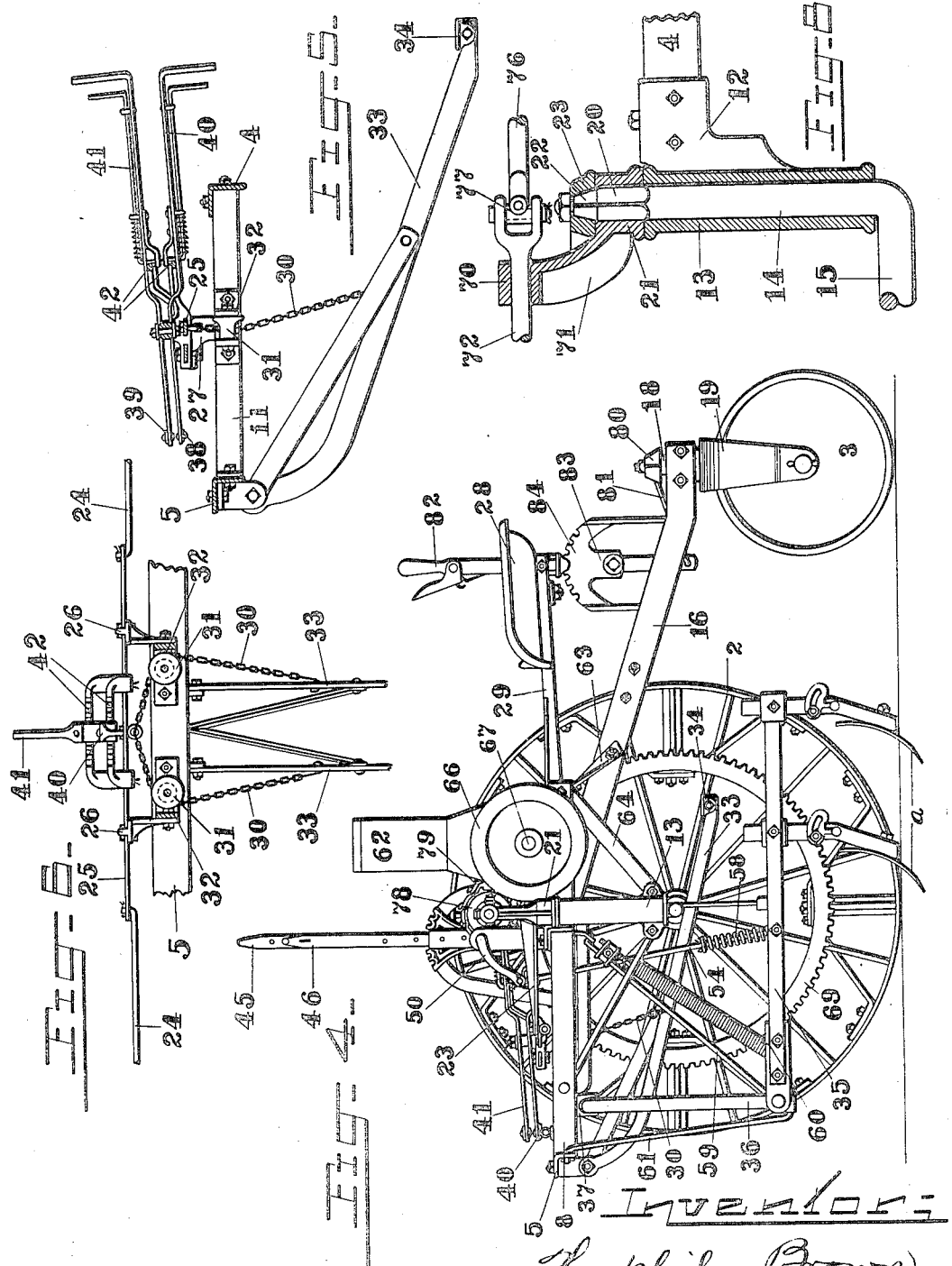

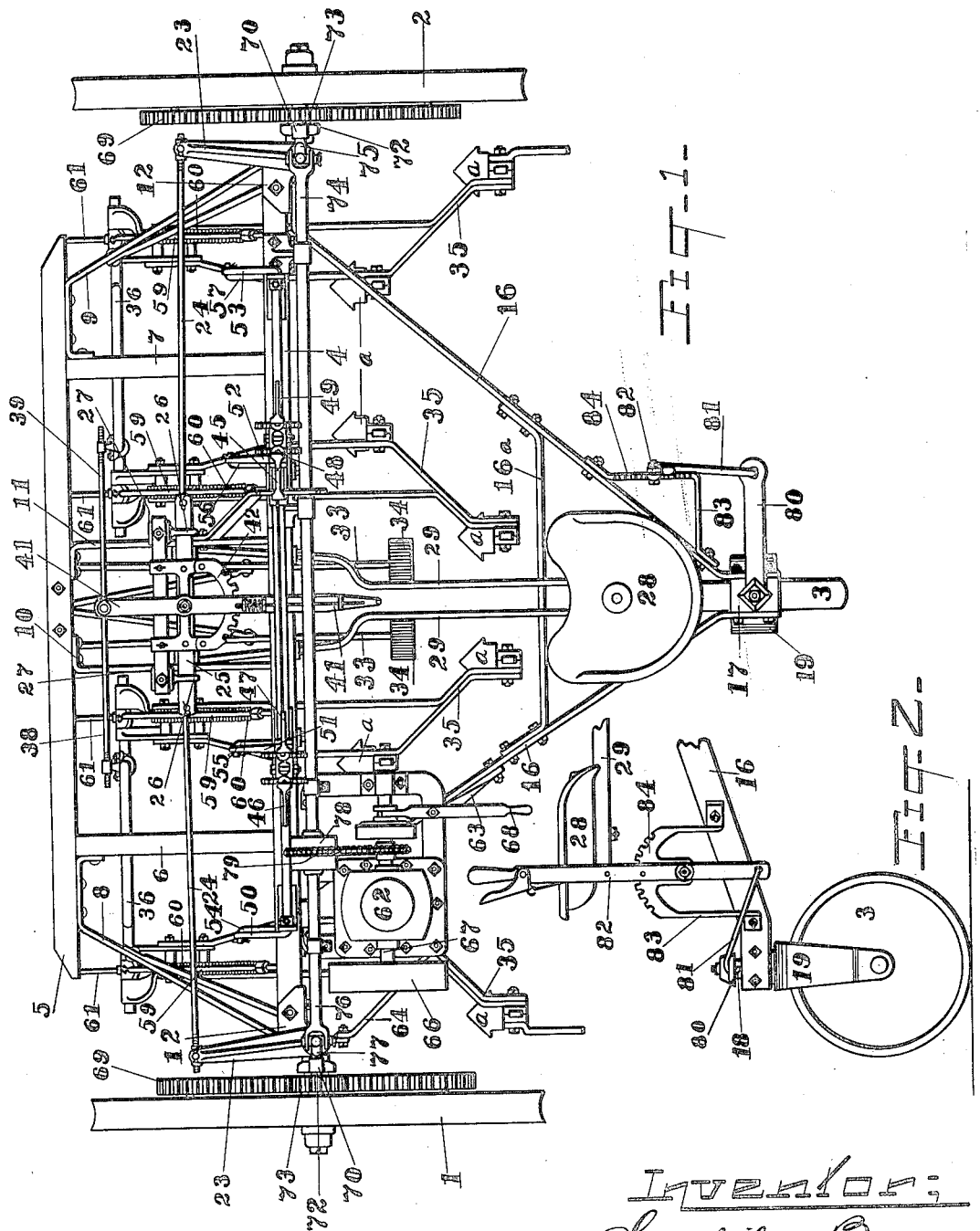

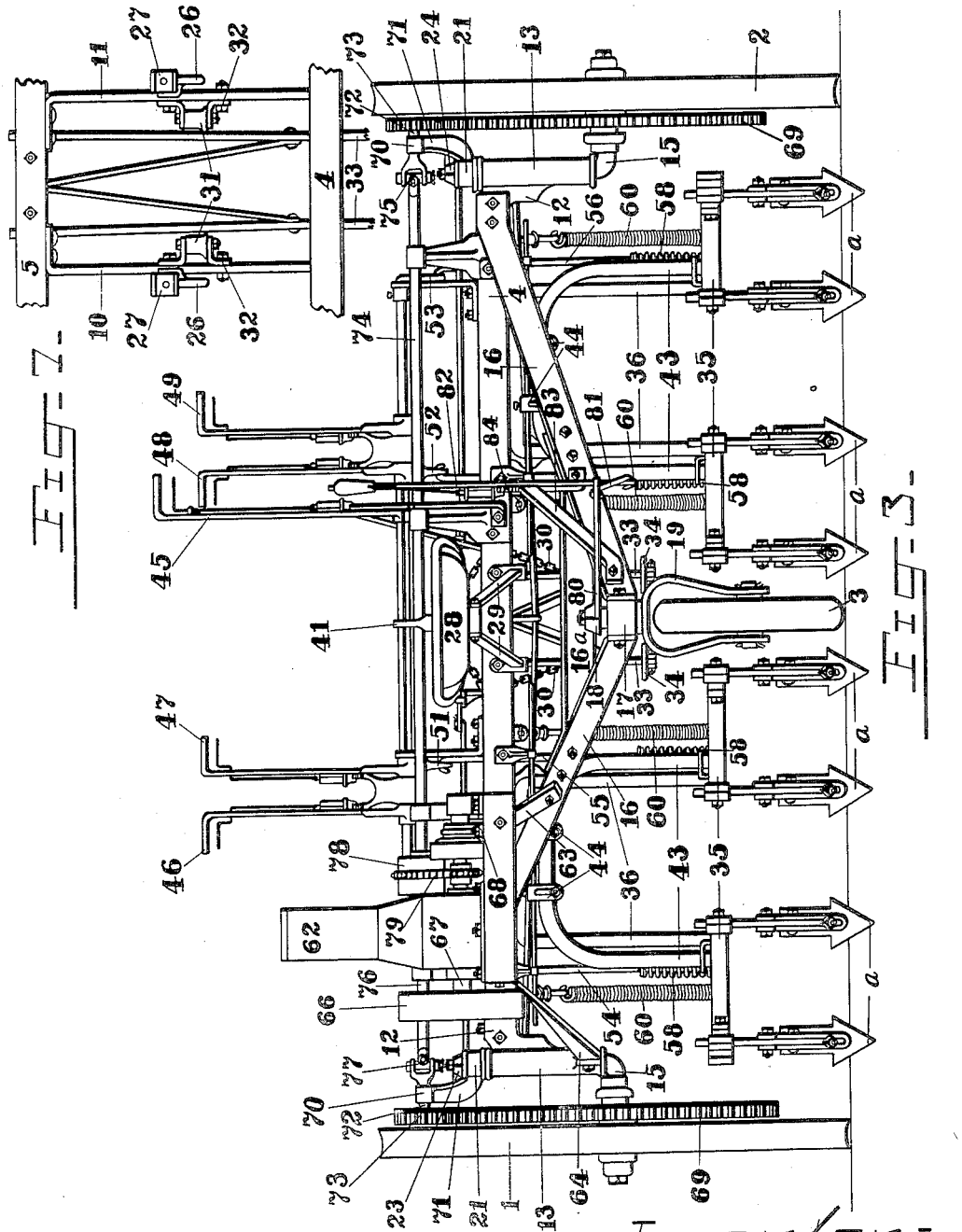

Patented Apr. 10, 1923.                                                                1,451,672

UNITED STATES PATENT OFFICE.

THEOPHILUS BROWN, OF MOLINE, ILLINOIS, ASSIGNOR TO DEERE AND COMPANY, OF MOLINE, ILLINOIS, A CORPORATION OF ILLINOIS.

MOTOR CULTIVATOR.

Application filed March 23, 1917, Serial No. 156,997. Renewed September 2, 1922. Serial No. 586,024.

*To all whom it may concern:*

Be it known that I, THEOPHILUS BROWN, a citizen of the United States, residing at Moline, in the county of Rock Island and State of Illinois, have invented certain new and useful Improvements in Motor Cultivators, of which the following is a specification, reference being had therein to the accompanying drawing.

My invention relates to agricultural implements, and more particularly to that class employed for tillage purposes such as a cultivator; and the object of my invention is to combine with an implement of that class a mechanical source of power, preferably an explosive engine, from which the operative power is conveyed to the supporting wheels of the implement by intermediate mechanism which, together with the motor is preferably supported on the implement itself. A further object of my invention is to add to the steering facilities by which the implement is guided or turned. Other objects will develop with the following description.

Referring to the drawings in which similar numerals indicate identical parts—

Figure 1 is a plan view of a two row cultivator embodying my invention. Figure 2 is a side elevation of the rear wheel and the mechanism by which it is controlled. Figure 3 is a rear elevation of Figure 1. Figure 4 is a side elevation of Figure 1 with the near wheel removed. Figure 5 is an enlarged detail view of part of the steering and gang adjusting mechanism. Figure 6 is a rear view of part of Figure 5. Figure 7 is a part detail in plan of Figure 5, and Figure 8 is an enlarged detail of a wheel support and power shaft connection.

The frame, supported by wheels 1 and 2 and a rear wheel 3, includes a bar 4, preferably slightly forward of the transverse axis of the wheels 1 and 2, and a bar 5 forward of the bar 4 and parallel therewith, both bars being rigidly connected by cross bars 6 and 7 and braces 8 and 9, and centrally of the structure by cross bars 10 and 11. On the ends of the bar 4 are mounted brackets 12 having vertical bearings 13 in which are rotatably journaled spindles 14 of axles on the right angular portions 15 of which the wheels 1 and 2 are mounted. Rigidly connected to the bar 4 and extending convergingly rearward and downward are bars 16 between the rear ends of which is secured a bearing 17 in which is journaled, to freely rotate, the spindle portion 18 of a bifurcated support 19 for the rear wheel 3; a transverse brace 16ª is connected to the bars 16.

A portion 20 of the spindles 14, above the bearing 13, is square in cross section, and fitted thereon are collars 21; the extreme ends 22 of the spindles are also square in cross section and have mounted rigidly thereon forwardly extending arms 23 to the forward ends of which are connected rods 24; the rods 24 extend toward the center of the cultivator and are connected to a sliding bar 25 slidably mounted in guides 26 on brackets 27 secured on the bars 10 and 11. A seat 28 is suitably supported on bars 29 which extend forwardly to the bars 10 and 11 to which they are secured.

Midway of the sliding bar 25 a chain 30 is secured central of its length and extends in opposite directions to pass over rollers 31 mounted on brackets 32 on the bars 10 and 11. The ends of the chain 30 are secured to foot levers 33 pivotally supported on the bar 5; the foot levers extend rearwardly to within convenient reach of the seat 28 their free ends terminating in treadles 34, so that the operator can, by pressing on either the treadles 34 move the sliding bar 25 to the right or left, and as the spindles 14 are connected to the latter through the arms 23 and arms 24, the wheels 1 and 2 can be readily adjusted to the desired angle to cause the cultivator to travel to the right or left as may be necessary in cultivation of plants in uneven rows.

The gang beams 35 are pivotally connected to arches 36, and carry gangs of tillage devices, in this instance shovels *a*, the latter being so positioned as to engage the earth on lines in the transverse vertical planes of the wheels for reasons to be described. The arches 36 and the gang beams carried thereby can be bodily shifted laterally. The arches 36 are supported to slide transversely in guides 37 secured to the underside of the frame bars 6 and 7. They are shifted or adjusted by links 38 and 39, the former connected with a lever 40 and the latter with a lever 41; each lever has a notched rack 42, on which it is pivotally mounted and is provided with the usual type of hand latch and dog. The notched racks 42 are secured to the sliding bar 25 to move therewith so that when the levers 40 and 41 are latched with the notched racks 42 and the foot levers 33 are operated to angle the wheels the tool gangs are simultaneously moved in the same direction, yet each pair of gangs is independently laterally adjustable by operation of the lever to which it is connected.

The gang beams are paired and held together in proper relation by supplemented arches 43 which are supported in brackets 44 on the frame bar 4 and have a sliding movement on the brackets to permit easy lateral adjustment of the gangs; the connection of the gangs to the arches 43 permitting a vertical swinging movement of the gangs.

For raising all the gangs of both pairs simultaneously I employ a master lever 45, and also levers 46, 47, 48, and 49 for raising, lowering and adjusting any gang independently of the others. Each of the latter levers actuates a rock arm on the frame bar 4, these rock arms, respectively, having cranks 50, 51, 52 and 53 which are connected with the gangs, respectively, by rods 54, 55, 56 and 57. Downwardly bearing compression springs 58 are mounted on each of the last said rods respectively, but each is adapted to permit its gang to move vertically independently of the others, as frequently becomes necessary because of the tools engaging with obstructions. Braces 59 extend upward and rearward from the lower part of the arches 36, and are, at their upper ends fastened to the frame by pivoting devices which permit the arches to be laterally moved. Each tool gang has an expansion spring 60 which is adjustably connected to one of the braces 59, these springs assisting in lifting the gangs when moved by one of the controlling levers. The arches 36 are further braced in relation to the frame bar 5 by the pivoted braces 61.

On the frame bar 4 I mount a motor 62, preferably of the explosive type, which is further supported by a brace 63 connected to the base thereof and to one of the bars 16; a brace 64 also extends from the motor base to connection with the bearing 13. It will be noted that I have mounted the motor rearward of the transverse axis of the wheels and within easy access of the operator of the machine. The motor is provided with a balance wheel 66 carrying on its shaft 67, on the opposite side of the motor, a clutch of any well known type which is operated by a lever 68.

The wheels 1 and 2 have mounted upon them concentric with their axes, gear wheels 69. Journaled in bearings 70 on upwardly extending arms 71, preferably integral with the collars 21, are stub shafts 72 carrying pinions 73 which mesh with the gear wheels 69. A shaft 74 is mounted in bearings on the frame bar 4 and is connected to the right stub shaft 72 by a universal joint 75; a shaft 76 is journaled in bearings on the frame bar 4 and is connected to the left stub shaft 72 by a universal joint 77. The centers of the universal joints 75 and 77 are in direct alinement with the axes of the spindles 14 so that when the latter are turned in angling the wheels 1 and 2 the revolution of the shafts transmitting power from the motor to the wheels 1 and 2 is in no way impaired. The inner ends of the shafts 74 and 76 are connected with a differential gearing 78, the latter being actuated from the motor 62 by a sprocket chain 79. I have not more fully illustrated the differential gearing as there are many types any one of which would be suitable for my purpose, it is essential however, in order that when making a turn with the implement the pivot wheel may revolve at a lesser speed and still have traction power.

To further facilitate steering the implement I have made the rear wheel controllable in the following manner; to the upper end of the spindle 18 I secure rigidly a laterally projecting arm 80 having its free end perforated for the reception of a hook end of a link 81 which extends to and is connected with the lower end of a lever 82; the lever 82 is pivotally supported, intermediate its ends, on a bracket 83, mounted on the right hand bar 16, and is provided with the usual type of latch to engage with notches in an arcuate rack 84 preferably integral with the bracket 83. The lever 82 is located close to the seat 28 to be within easy reach of the driver and convenient for manipulation.

The operation of the implement will be readily understood. The motor is started, and by operation of the lever 68 the clutch is closed and power to rotate the wheels 1 and 2 to move the implement is conveyed to the differential by the chain 79, and through the shafts and connected gearing to the wheels 1 and 2, and the implement is then brought into proper position relatively to the rows of plants to be cultivated.

The implement shown in the drawings is capable of cultivating two rows of plants simultaneously, the line of plants of one row being between the two right hand tool gangs, and the line of the other row lying between the two left hand gangs. The operator and the steering wheel are on longitudinal lines between the two rows under cultivation, and the field at all points in front of the implement is open to view.

The operator steering the implement by actuating the foot levers 33 has his hands entirely free to control the starting and stopping of the motor, and the adjustment of the tool gangs and the rear wheel.

Heretofore, cultivators having their tools, together with the tool supporting and adjusting mechanism, arranged in relation to the steering wheels in the way above described, and moved over the ground by power from a tractor connected thereto, have developed disadvantages and difficulties which I have overcome in my construction, as shown and described.

The principal and most desirable object is that the operator should be able to direct his sight and attention to the plants and to the lines along which they are growing, and that there should be an avoidance of all occasion for him to remove his sight from the plants, as, for instance, the raising of his eyes to give regard to the operation or position of the tractor.

Another matter found necessary for perfect steering and controlling of the implement relatively to the plants is that there should not be in front of the tools any of the steering wheels and draft agency engaging with the ground and only slowly movable toward one side or the other.

I have avoided these difficulties by combining with the apparatus above described a power means which engages with the steering wheels 1 and 2 and actuates them to propel the implement in the described direction, this permitting me to dispense with all ground engaging objects connected with the tool frame at points in front of the tools, and opening the way for having the tools brought quickly and accurately to any desired working point.

If the lines of the plant rows are straight and parallel, it is merely necessary to secure a proper initial adjustment of the steering wheels and positioning of the gangs, the lines of advance being easily maintained by the operator through the agency of the foot levers and the hand levers 40 and 41 and 82. But during the greater part of the time, conditions are met with which demand that the tools should be thrown laterally in one direction or the other. The rows of the plants are not perfectly alined and are not parallel, or other facts make it necessary to bring the tools to and from the positions actually occupied by the plants. With the earlier tractor actuated mechanisms of which I have knowledge, the tractor steered independently of the cultivator, the parts are so related that an appreciably long period of time is necessary to move a tool, or gang of tools, from one position to another, and the speed of advance is such that the tools cannot be thrown in and out with sufficient quickness to attain thorough cultivation and to avoid marring of the plants.

With the construction shown and described however, with the motor mounted on the cultivator and the power transmitted to the tractor wheels, which are at the same time the supporting wheels of the cultivator, and having these wheels as well as the rear supporting wheel dirigible, the machine is quickly responsive in steering to follow irregular alinement of plants, or in making a turn of greater or lesser degree.

What I claim is—

1. A power driven tillage implement comprising a frame, a pair of dirigible wheels supporting the front portion of the frame and adapted to be swung to guide the implement when in operation, a motor mounted on the frame, power transmitting connections between the motor and said wheels, tillage devices adapted to be moved laterally through the surface parts of the soil while they are advancing in operation and mounted at the front of the frame, and a steering wheel mounted at the rear of the frame and operable independently of the said dirigible wheels.

2. A power driven tillage implement, comprising a frame, a pair of dirigible wheels supporting the front portion of the frame and adapted to be swung to guide the implement when in operation, a motor mounted on the frame, power transmitting connections between the motor and said wheels, tillage devices adapted to be moved laterally through the surface parts of the soil while they are advancing in operation and mounted at the front of the frame and movable laterally therewith as the forward portion of the frame is swung to one side or the other in steering, and a steering wheel mounted at the rear of the frame and operable independently of the said dirigible wheels.

3. A power driven tillage implement, comprising a frame, a pair of dirigible wheels supporting the front portion of the frame, and adapted to be swung to guide the implement when in operation, a motor mounted on the frame, power transmitting connections between the motor and said wheels, tillage devices adapted to be moved laterally through the surface parts of the soil while they are advancing in operation and mounted at the front of the frame and movably laterally therewith as the forward portion of the frame is swung to one side or the other in steering, a steering wheel mounted on the rear of the frame and operable independently of the said dirigible wheels, and means to actuate the steering wheel to vary the direction of travel of the implement.

4. A power driven tillage implement, comprising a frame, a pair of dirigible wheels supporting the front portion of the frame and adapted to be swung to guide the implement when in operation, a motor mounted on the frame, power transmitting connections between the motor and said wheels, tillage devices adapted to be moved laterally through the surface parts of the soil while they are advancing in operation and mounted at the front of the frame and movable laterally therewith as the forward portion of the frame is swung to one side or the other in steering, a steering wheel mounted at the rear of the frame and operable independently of the said dirigible wheels, and a lever mechanism adapted to actuate the steering wheel to vary the direction of travel of the implement.

5. A power driven tillage implement, comprising a frame, a pair of dirigible wheels supporting the front portion of the frame and adapted to be swung to guide the implement when in operation, a motor mounted on the frame, power transmitting connections between the motor and said wheels, tillage devices adapted to be moved laterally through the surface parts of the soil while they are advancing in operation and mounted at the front of the frame and movable laterally therewith as the forward portion of the frame is swung to one side or the other in steering, a steering wheel mounted at the rear of the frame and operable independently of the said dirigible wheels, means to swing the dirigible wheels, and means to independently swing the rear steering wheel.

6. A power driven tillage implement, comprising a frame, a pair of dirigible wheels supporting the front portion of the frame and adapted to be swung to guide the implement when in operation, a motor mounted on the frame, power transmitting connections between the motor and said wheels, a steering wheel mounted at the rear of the frame and operable independently of the said dirigible wheels, tillage devices adapted to be moved laterally through the surface parts of the soil while they are advancing in operation and mounted at the front of the frame and movable laterally therewith as the forward portion of the frame is swung to one side or the other in steering, and means to move said tillage devices laterally independently of the movement of the frame.

7. A power driven tillage implement, comprising a frame, a pair of dirigible wheels supporting the front portion of the frame and adapted to be swung to guide the implement when in operation, a motor mounted on the frame and having power transmitting connections with said wheels, a steering wheel mounted at the rear of the frame and operable independently of the said dirigible wheels, tillage devices adapted to be moved laterally through the surface parts of the soil while they are advancing in operation and mounted at the front of the frame and movable laterally therewith as the forward portion of the frame is swung to one side or the other in steering, and means to move the tillage devices laterally independently of the action of the dirigible wheels and the rear steering wheel.

8. In an implement for tilling soil along laterally varying lines of approximately predetermined length, the combination of a frame, tillage tools carried thereby, dirigible supporting wheels at the front end of the frame which are optionally movable relatively thereto, a motor carried by the frame, power transmission devices between the motor and the dirigible wheels including a compensating gearing, whereby the wheels are driven with equal power at different speeds, a supporting wheel under the rear end of the frame, and means for optionally turning it laterally.

In testimony whereof I affix my signature, in presence of two witnesses.

THEOPHILUS BROWN.

Witnesses:
JESSIE SIMSER,
W. G. DUFFIELD.